United States Patent
Memoli et al.

(10) Patent No.: US 7,942,949 B2
(45) Date of Patent: May 17, 2011

(54) METHOD AND APPARATUS FOR THE RECOVERY OF REFRACTORY DEBRIS MATERIALS AND LADLE SLAGS AS PROCESS SLAGS IN IRON METALLURGY PRODUCTION IN EAFS, AND THE RELATED METERING TO THE FURNACE FOR THE FORMATION OF THE PROCESS SLAG

(75) Inventors: Francesco Memoli, Milan (IT); Osvaldo Brioni, Brescia (IT); Mauro Bianchi Ferri, Milan (IT)

(73) Assignee: Techint Compagnia Tecnica Internazionale S.p.A., Milan (IT)

( * ) Notice: Subject to any disclaimer, the term of this patent is extended or adjusted under 35 U.S.C. 154(b) by 178 days.

(21) Appl. No.: 11/886,271

(22) PCT Filed: Mar. 28, 2006

(86) PCT No.: PCT/EP2006/003244
§ 371 (c)(1),
(2), (4) Date: Apr. 23, 2008

(87) PCT Pub. No.: WO2006/103115
PCT Pub. Date: Oct. 5, 2006

(65) Prior Publication Data
US 2009/0107295 A1 Apr. 30, 2009

(30) Foreign Application Priority Data
Apr. 1, 2005 (IT) .............................. MI2005A0539

(51) Int. Cl.
C22B 7/04 (2006.01)
C21B 13/12 (2006.01)
C21C 7/076 (2006.01)

(52) U.S. Cl. ......... 75/10.46; 75/10.58; 65/19; 241/24.1; 241/24.14

(58) Field of Classification Search ................. 75/10.46, 75/10.58; 65/19; 241/24.14, 24.1
See application file for complete search history.

(56) References Cited

U.S. PATENT DOCUMENTS
6,544,314 B2 *  4/2003  Stendera et al. ............. 75/10.12
7,377,955 B1 *  5/2008  Shaw et al. ..................... 75/414

FOREIGN PATENT DOCUMENTS
DE            3201608        9/1982
EP            0753586 A2     1/1997
(Continued)

OTHER PUBLICATIONS
Machine translation of JP 06-116617 published Apr. 26, 1994.*
(Continued)

Primary Examiner — George Wyszomierski
Assistant Examiner — Tima M McGuthry-Banks
(74) Attorney, Agent, or Firm — Hedman & Costigan, P.C.; James V. Costigan

(57) ABSTRACT

A method for the recovery of refractory debris materials and ladle slags as process slags in the iron metallurgy production in EAFs and the related metering to the furnace for the formation of the process slag comprises the following steps: grinding and screening of the refractory debris materials until powders of controlled granulometry are obtained, storage of the powders in storage sites, injection of the powders into an EAF furnace by means of automatic metering of the various components.

9 Claims, 6 Drawing Sheets

FOREIGN PATENT DOCUMENTS

| | | |
|---|---|---|
| FR | 2283957 | 4/1976 |
| FR | 2766110 | 1/1999 |
| JP | 06-116617 | 4/1994 |
| JP | 07-166222 | 6/1995 |
| JP | 07-331316 | 12/1995 |
| WO | WO 02/38816 A1 | 5/2002 |

OTHER PUBLICATIONS

Metering. (n.d.). Dictionary.com Unabridged. Retrieved Aug. 31, 2010, from Dictionary.com website: http://dictionary.reference.com/browse/metering.*

International Search Report, Nov. 16, 2006.

* cited by examiner

METHOD AND APPARATUS FOR THE RECOVERY OF REFRACTORY DEBRIS MATERIALS AND LADLE SLAGS AS PROCESS SLAGS IN IRON METALLURGY PRODUCTION IN EAFS, AND THE RELATED METERING TO THE FURNACE FOR THE FORMATION OF THE PROCESS SLAG

The present invention refers to a method and apparatus for the recovery of refractory debris materials and ladle slags as forming elements of the process slags in the production of steel in electric arc furnaces (EAFs) as well as the metering of such recovery materials in order to optimise the composition of such slag by reducing the need to purchase pure materials from the market.

The problems connected with respect for the environment are increasingly critical in the validity and profitability of an industrial process, and this is especially true of the iron metallurgy field.

In particular, in the field of secondary iron metallurgy, interest is focused on the chemical-physical characteristics of the (EAF) slag as means for reducing the consumption, production costs and for reducing the environmental impact. Characteristics such as the chemical composition and foaminess have in fact direct repercussions on the life of the refractories, on the wear of the electrodes, on heat efficiency of the process, on the time of fusion ("tap to tap") and, in final analysis, on all energy consumptions for the obtainment of steel. The EAF slag must adhere to very high requirements in terms of composition, such that it has been necessary to employ pure materials purchased directly on the market for its furnace formation.

As an example, a composition containing a significant quantity of MgO and CaO increases the slag's compatibility with the refractory coating, decreasing the chemical aggression and prolonging the reconstruction times of the refractories of the entire liquid metal line. In fact, one of the critical points encountered in the secondary iron metallurgy production with EAF is the high quantity formation of Ferrous Oxide (FeO) which is separated from the liquid metal by passing into the slag.

Such compound is not very stable at high temperatures, inducing phenomena of chemical aggression towards the refractory coating. For example, MgO reacts chemically with FeO and $SiO_2$, producing more stable compounds, such as the "Magnesium-Wustite" (MW: (Fe,Mg)O) and the "Olivine" $(FE, Mg)_2SiO_4$, which is much less aggressive with regard to the containment structures of the liquid metal.

The ferrous oxide has a further negative effect, which is that of lowering the fusion temperature of the slag and consequently reducing the viscosity.

Iron metallurgy practice, on the other hand, foresees the necessity of a slag in foamy form.

The formation of a slag in foamy form is favoured by the presence of solid phases, finely dispersed in the melted mass (in the liquid phase), which act as nucleation sites of CO bubbles produced by the oxidation of the carbon injected into the bath. A foamy phase is capable of enveloping the electrode, and therefore maintaining the arc protected and confined to the slag interior. The same bubbles, then, limit the thermal conductivity of the slag by reducing the external heat dispersion of the liquid metal reaction bath.

Both effects act to improve the overall heat efficiency of the process.

The characteristic of "foaming" of the slag increases with the reduction of the surface tension and the increase of viscosity. The presence of suspended particles moreover favours such characteristic. An "optimal" slag, that which is looked for during the EAF process, must not be completely liquid, but saturated with $Ca_2Si_4$ ($C_2S$) and/or MgO (magnesium-wustite solid solution), respectively, whose particles act as nucleation sites of CO with the formation of numerous small bubbles in the slag.

Such "foaminess" is attained, in a conventional process, by adding the necessary quantities of lime and dololime (in addition to the normal insufflation of oxygen and carbon).

Such supply materials are normally pure raw materials purchased on the market and their metering derives from a chemical analysis of the slag.

The critical points in the conventional cycle are in the high purchase costs of the raw material necessary for the foam formation. Materials rich in the same base compounds, such as the process slags or the refractory debris materials deriving from reconstructions or demolitions of refractory layers, always present in steelworks, are however destined to be sent to the dump, with further disposal costs (and costs of stabilisation conditioning).

Such refractory debris materials are substantially intended as: the ladle refractory, the tundish refractory, the electric arc furnace refractory, and the fines coming from the plant's depulverisation system, while for process slag it is intended the powder, rich in $C_2S$, deriving from the breakdown of the ladle slag.

The refractory debris comes from the demolition of the protective coatings of the ladles, of the tundishes and from the refractories composing the walls and bottom of the same electric arc furnace when wear or normal maintenance requires its reconstruction.

Such materials are bricks, "refractory lined" and "spray coated" (especially from tundishes), whose composition is mainly composed of calcium oxides and magnesium oxides; the presence of dicalcium silicate is, on the other hand, insignificant.

The normal disposal procedure foresees sending to the dump with minor precautionary measures, mainly due to the perception of odours and the formation of fine powders deriving from hydration and carbonation phenomena associated with the exposure to humidity or to carbon dioxide. The reaction products such as the hydroxides and carbonates have a greater volume than the respective oxides, and hence with their formation they tend to finely crumble the previous matrix.

In addition to the compounds stated above, iron oxides, aluminium and silica are normally present, often residues of the processes with liquid metal.

In particular, the ladle refractory is composed of bricks based on calcium and magnesium oxides with possible metallic residues from the steel production cycle.

The products of the tundish refractory demolition are composed of bricks or spray mass (monolithic coating), mainly characterised by the presence of magnesite with smaller percentages of silica, lime, aluminium and residues of steel and slag. The recovery of the metal present is normal, as this may be added to scraps entering the fusion process, while the refractories are normally sent to the dump.

The debris materials from electric arc furnace reconstructions are generally composed of bricks based on magnesite and compact monolithic coatings based on magnesite as well, and lime with the presence of ferrous oxides and carbon. Such materials are only partially reused for the subsequent reconstruction. Moreover, it is possible to recover the fines coming from the depulverisation system of the slag treatment facilities, such powders being mainly composed of lime, silica, magnesium oxide, aluminium, carbon and other materials.

A further source of recovery materials is represented by the ladle slag substantially composed of lime, by EAF slag possible transported in the ladle during the furnace tapping operation, by oxidation products of the bath and by wear refractory products. The composition of the ladle slag also varies in relation with the secondary metallurgy processes necessary for producing the type of desired steel.

The ladle slag therefore has a regular composition which foresees about 60% calcium oxide and magnesium oxide and about 20% of silica and aluminium.

The mixture of the previously described by-products is composed of about 90% from the ladle slag, about 3% from the ladle refractory and tundish refractory, respectively, 2.5% from furnace refractory and about 2% from recovery fines.

It should be underlined that the normal operating procedure of steelworks does not foresee any significant recovery of these debris and process materials.

In particular, the metering of the refractory debris materials and process slags of the iron metallurgy production in EAFs, in the slag to be recycled in the electric arc furnace, permits realising two fundamental objectives: reducing the natural resource exploitation and minimising the quantity of consumed material to dispose of.

The present invention proposes resolving these problems and overcoming the drawbacks present in the state of the art by means of appropriate systems of preparation or recovery and metering of the debris and process materials in order to obtain an optimal composition of slag to be recycled in the electric arc furnace.

Therefore, object of the present invention is a method for the recovery of refractory debris materials and ladle slags as process slags in iron metallurgy production in EAFs and the related metering to the furnace for the formation of the process slag, such method comprising the following steps:

grinding and screening of the refractory debris materials until controlled granulometry powders are obtained storage of the powders in storage sites, injection of the powders into an EAF furnace by means of automatic metering of the various components.

Further object of the present invention is an apparatus for the recovery of refractory debris materials and process slags of the iron metallurgy production in EAF, and for the related metering and recycling in the furnace, such apparatus comprising a controlled granulometry grinding section of the refractory debris materials, metering of the components for the formation of the ideal mixture for the recycling, a breakdown section of the ladle slag, a section of deferrisation and screening, at least one storage bin equipped with a related extractor, a control system, an injection system into the EAF, a suction and treatment system of fumes and dust.

In particular, the method according to the present invention may also foresee, before the storage step, a breakdown step of the ladle slag, which comprises a forced cooling step until a controlled granulometry powder is obtained, which generates powders which may be directly used in the process described here. In particular, the refractory debris materials comprise ladle refractory, tundish refractory, electric arc furnace refractory, recovery powders or fines.

The apparatus according to the invention foresees a grinding and screening section of the refractory debris materials which comprises a mill, a hopper and a vibro-extractor or vibrating channel connected to the hopper. The apparatus according to the present invention also possibly foresees a breakdown section of the process slag.

In particular, in the method according to the present invention, the metering of the various components necessary for the obtainment of the process slag may be carried out at the time of the generation of the powder deriving from the recovery materials, or else at the intermediate storage bin before the injection in the furnace, or else directly in the furnace by means of one or more injectors.

In particular, the composition of the powder to be injected is automatically determined by the management system or other line management system.

Furthermore, the method according to the present invention may foresee, before the storage step, a deferrisation and/or dimensional screening process. The process of deferrisation foresees the recovery of the iron by means of a magnetic separator. The dimensional screening process foresees a screening with screen with opening preferable up to 10 mm.

The high MgO and CaO content (respectively 35÷55% and 15÷55%) of the consumed bricks and the possible addition of breakdown products of the ladle slag makes the recovery of this type of material particularly advantageous. Indeed, the appropriate grinding to a size which is compatible with the transport and furnace injection permits eliminating the disposal in dumps of this material type and simultaneously reducing the amount of magnesite and/or dololime acquisition for the addition in EAF.

This advantageous result, together with the recovery of material with a high CaO content, which is obtained through the accelerated breakdown process and which permits decreasing the consumption of lime to be loaded into the furnace, contributes to further reducing the operation costs.

Indeed, the main advantage of the method and apparatus, according to the present invention, consists of the preparation, by means of metering, of a powder deriving from the treatment of all available discard products which is capable of generating an "optimal" slag composition. Such "optimal" composition is determined by means of a calculation system based on a substance balance in relation with the available materials and a library comprising a vast range of "foamy" compositions of the slag (from the literature and practical experience). In particular, the choice of the optimal composition (work point) is automatically obtained in relation with the availability of the materials to be recycled and by means of substance balances aimed for obtaining the heterogeneous phases composed mainly of dicalcium silicate $2CaO.SiO_2$+ magnesium-wustite (MW)+liquid (liquid phase) or by means of "Isothermal Stability Diagrams" available on the market (such as, for example, that represented in FIG. 6). The choice of the additions during the work cycles is obtained by comparing the actual composition of the EAF slag, obtained by chemical analysis, with the "optimal" target composition (work point).

Moreover, the presence of a mill (or crusher) and the possibility to dispense the ground product with a metering device permits obtaining an ideal mixture of the residue of the ladle slag breakdown, dicalcium silicate $2CaO.SiO_2$, with a product rich in MgO coming from the refractories. Such mixture represents an optimal combination for the correct generation of foamy slag (finely dispersed solid phases of dicalcium silicate $2CaO.SiO_2$ and magnesium-wustite MW in a liquid silicate mass).

Further substantial advantage of the system according to the present advantage consists of realising a recycling of recovery products by means of injection, with higher kinetics (absorption of melted slag in the bath) and consequently improved efficiency.

Moreover, the recycling of the EAF ladle slag, by means of powder injection, permits recovering all of the dicalcium silicate contained in such slag ($2CaO.SiO_2$—$C_2S$—it is, in fact, the main constituent), without penalising the energy outputs of the furnace, since the dissolution and partial fusion of the powder injected under slag is extremely rapid given its high exposed surface to mass ratio (specific surface).

Further advantage is tied to the addition of MgO deriving from the ladle refractory, tundish refractory and furnace lining refractory, which favours the formation of a solid magnesium-wustite solution or MW phase, optimal for obtaining the foamy slag. Such solid phase functions, analogously to the finely dispersed solid particles of dicalcium silicate, as nucleation site of the CO bubbles.

The method for the recovery of refractory debris materials and ladle slags and the related metering, according to the present invention, permits transforming such recovery materials into an injectable powder rich in CaO and MgO, thus obtaining a composition mixture such to permit the substitution of most of the scorifying material added in the EAF.

Hence, there are diverse advantages which derive from the use of this innovative technology; they may be summarised as follows:

reduction of the scorifier consumption,
elimination of the dump disposal of materials,
availability of already optimised material for the powder injection systems for the production of EAF slag,
complete technology automation,
powder dispersion reduction due to the movement of the scorifying materials.

Overall, the listed advantages lead to a considerable improvement in the melting process and to a reduction of the steel production costs in the electric arc furnace.

The structural and functional characteristics of the present invention and its advantages with regard to the prior art shall be even clearer and more evident from an examination of the following description, referred to the attached drawings wherein.

Figure 1:
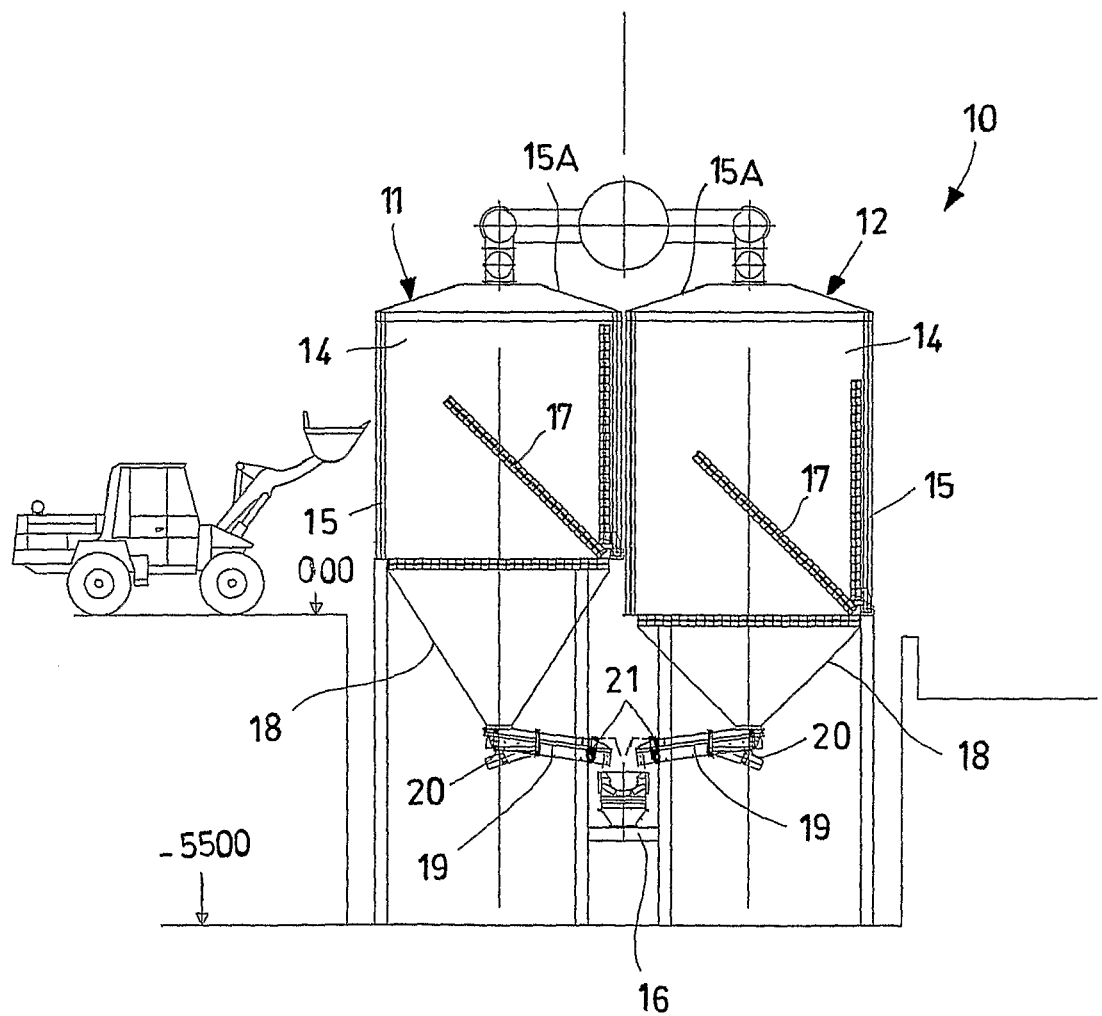
FIG. 1 is a side elevation view of an embodiment of the breakdown section.

With reference to FIG. 1, an embodiment is shown of the breakdown section with a conveyor belt 16 for the common transport of the pulverised material and a confinement system of the powders (15A) generated during the breakdown process.

The breakdown section represented in FIG. 1 (10) foresees two equal modules 11 and 12. Each module 11 or 12 has a metallic box 14 closed by moveable containment partitions 15. Each box 14 also foresees a powder confinement system 15A and a common conveyor belt 16 for the three boxes.

Inside each box 14, a vibrating and/or foldable grating 17 is foreseen, connected to an underlying hopper 18, which is in turn connected to a vibro-extractor or vibrating channel 19. The unloading mouth of the hopper is equipped with a towing gate 20. A small pneumatic closing gate 21 is foreseen on the exit mouth. Still in reference to the drawings, in general, and to FIGS. 2 and 5 in particular, an embodiment is schematically shown of an apparatus according to the present invention where the treatment facility of the material to be recycled (see FIG. 5) foresees at least one module (01) composed of one box (02), hopper (03), vibro-extractor (04), mill or crusher (05), transport-extraction system (06), metering hopper (07), extractor/metering device (08) and the common conveyor belt 16 of the treatment products.

Figure 2:
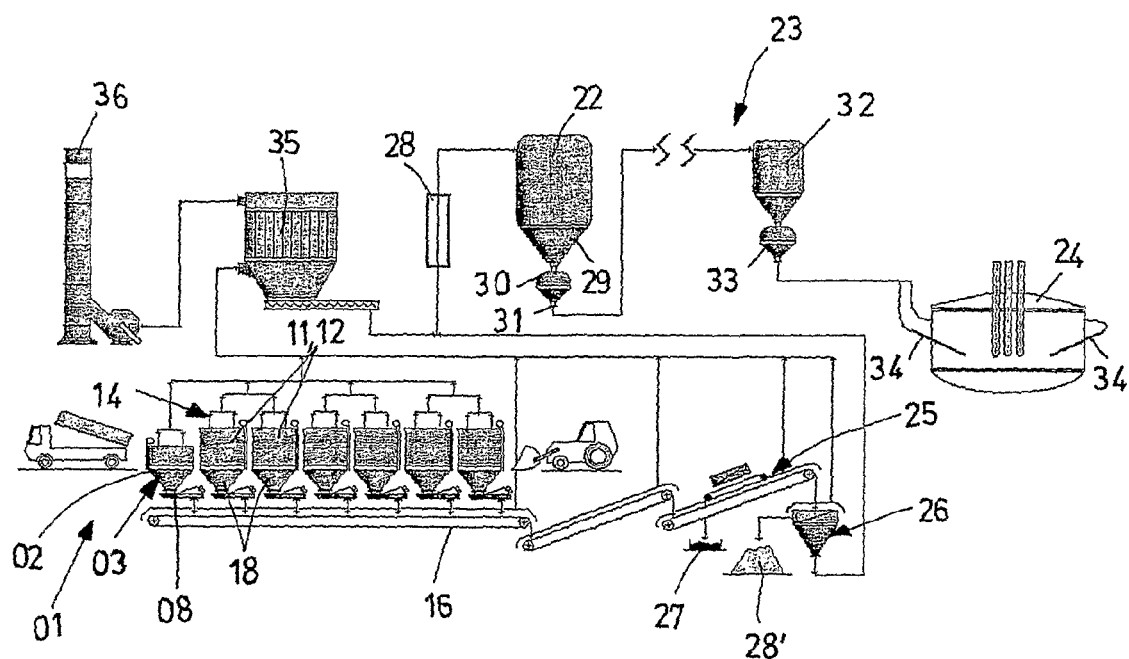
FIG. 2 is an overall schematic representation of an embodiment of the apparatus according to the present invention.

The material collected by the conveyor belt 16, coming from the modules 14 of ladle slag breakdown and from modules 01 of debris material grinding, is conveyed towards the collection storage bin 22, after which it is sent to the furnace injection system 23 (as in FIG. 2).

Figure 3:
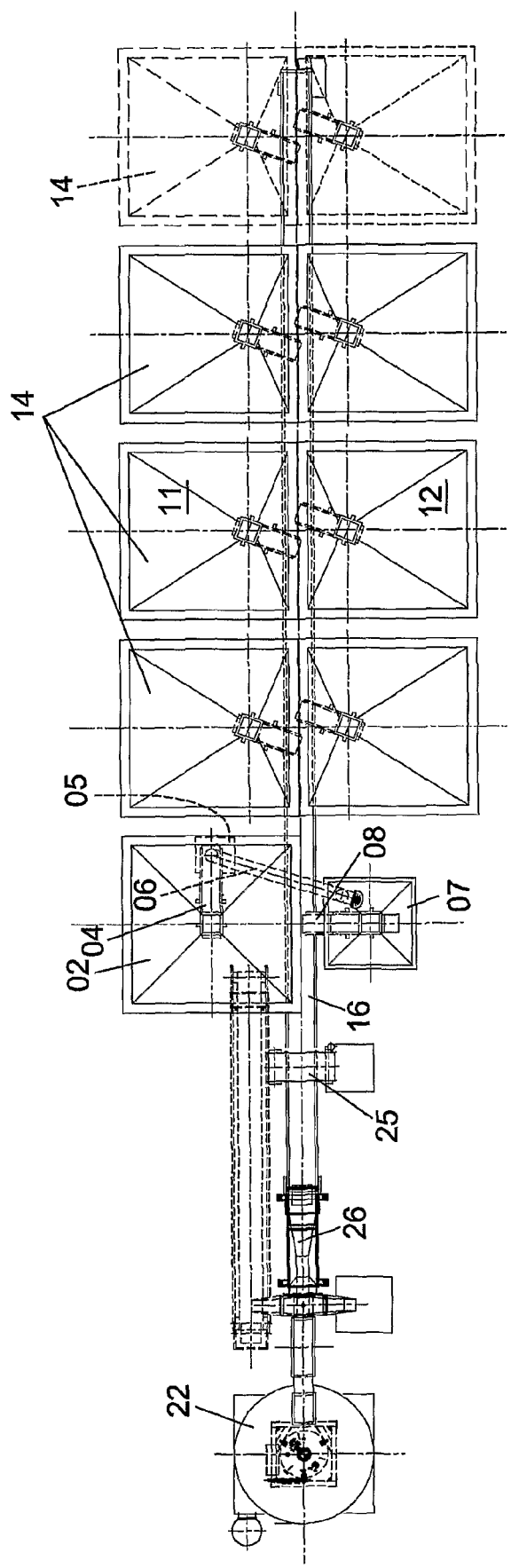
FIG. 3 is a plan view of an embodiment of the first part (treatment unit, debris material storage, and ladle slag breakdown) of the apparatus according to the present invention.
Figure 4:
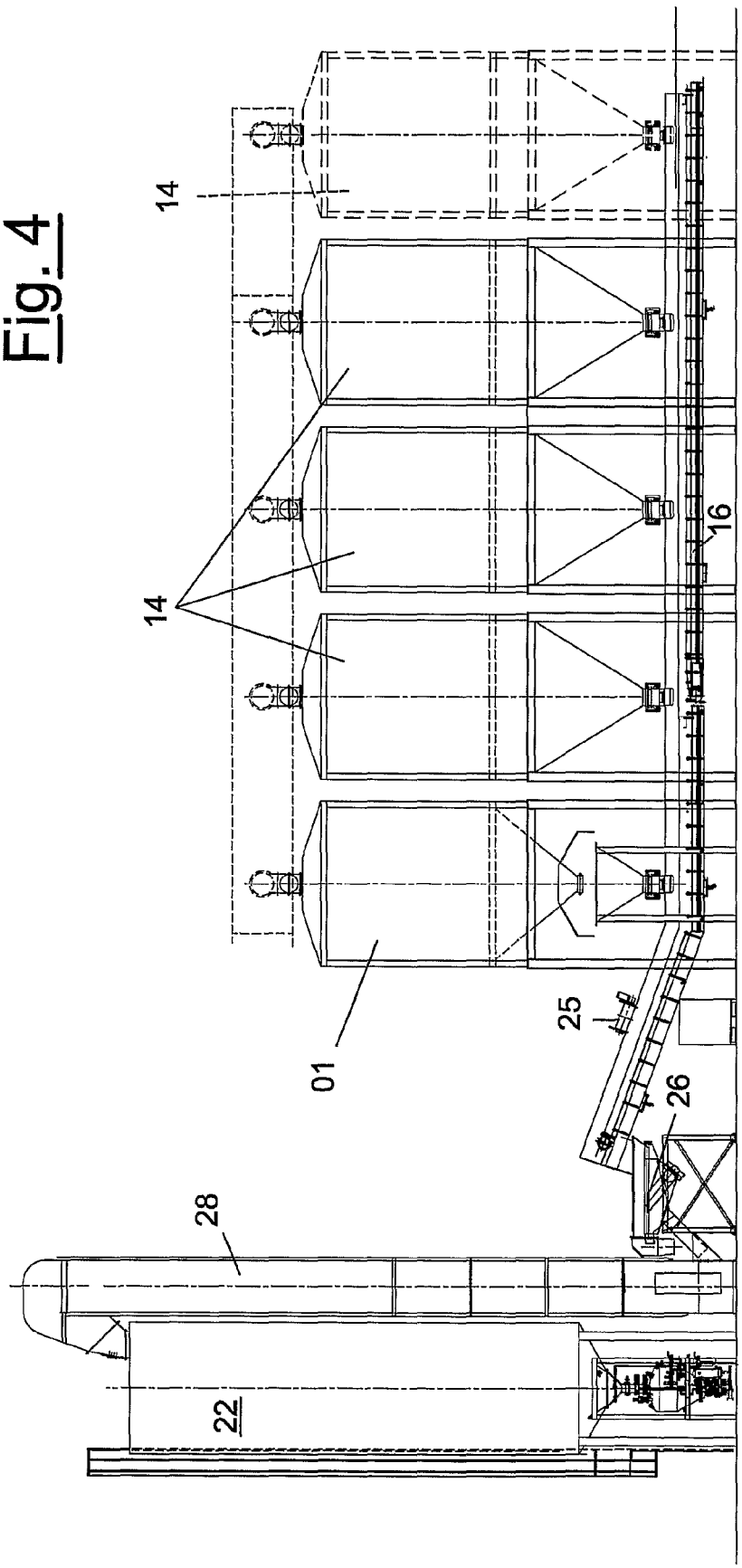
FIG. 4 is a side elevation view of FIG. 3.
Figure 5:
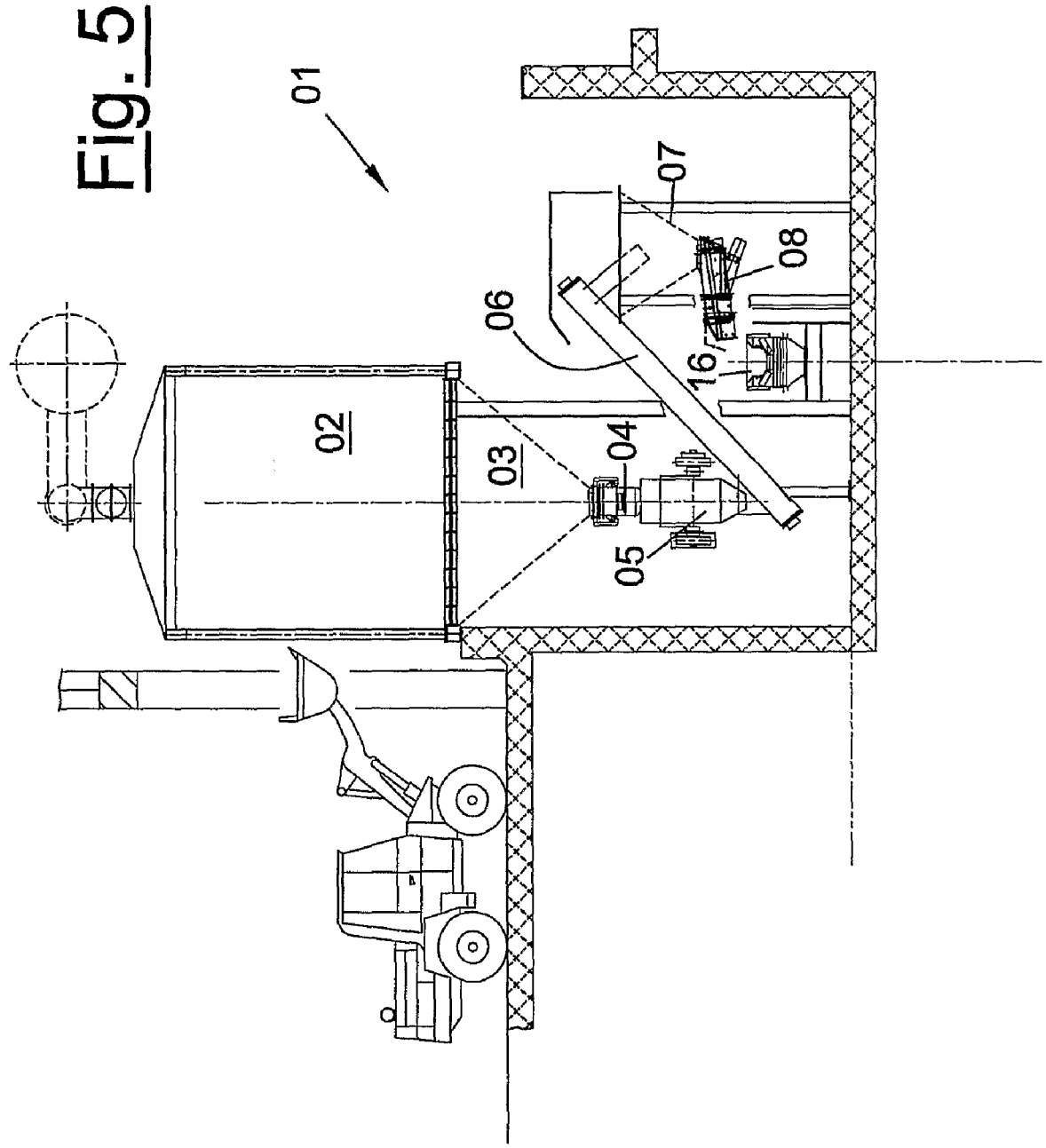
FIG. 5 represents a section of the storage, treatment and metering module of the debris material according to the present invention.

Still in FIG. 2, the screen and grinding section of the refractory debris materials is represented with 01. The positioning of such section, composed as in FIG. 5 by a material-collecting hopper, a mill with output over a calibrated grating (which may be substituted with gratings of different opening sizes) to obtain powders of <10 mm size (or jaw crusher+ granulator placed in series) and hopper for the metering of the broken up material, may be upstream (as in FIG. 2) or downstream (as represented in FIGS. 3 and 4) of the breakdown unit 14, and therefore before the magnetic separator and screen (25 and 26). A "downstream" position is preferred, since it simplifies the automatic recovery of the "oversize" material from the screen 26 to the mill 05. The section 01 of FIG. 5 represents a small grinding facility of the refractory debris for the recovery of materials with a high magnesite-lime content and is composed of a box 02 equipped with a hopper 03 for the reception of the refractory material, loaded for example by means of power shovel; by an extractor 04 connected to the unloading mouth of the hopper in order to feed the underlying crushing system 05. The ground material is conveyed by means of a suitable transport system to an intermediate hopper (07) for its metering. The related extractor 08 provides to dispense such material directly on the common conveyor belt 16. The powder mixture thus obtained is sent to the storage and injection section or facility, upon prior magnetic separation and screening, and is then injected into the electric furnace.

In particular, as reproduced in FIG. 5, the calibrated grinding section 01 of the consumed refractory materials is composed of components described in detail below:

one box 02 equipped with hopper 03 and a related sustaining and support structure for the reception of the refractory material loaded by means of power shovel. The hopper 03 is equipped with anti-wear coating welded on the sloped parts. An extractor is then foreseen, an electromechanical or electromagnetic vibrating extractor 04 connected to the unloading mouth of the hopper. The mill may be a hammer mill with material output grating of about 10 mm. The material thus crushed is loaded directly in the intermediate hopper 07 for its metering on the conveyor belt 16 which transports material coming from the breakdown section; it is then sent to the storage and injection facility, upon prior magnetic separation and screening.

The possibility may also be foreseen of using a second conveyor belt for sending the discards of the 6 mm screen to the mill.

In the path from the modules 14 to the collection storage bins 22 in FIG. 2, the material is further treated so to acquire the most suitable characteristics for furnace injection.

To this end, a process of deferrisation as well as dimensional screening is foreseen.

In FIG. 2, the deferrisation system is indicated with 25, and the screening system with 26.

In particular, the conveyor belt 16 is of closed type with hoppers. During the conveyor belt transport, the remaining ferrous part is recovered by means of a magnetic belt separator.

The ferrous material thus separated is collected in an appropriate container 27 which permits is subsequent recovery directed to the furnace. Before being sent to the collection storage bin 22, the material is selected so to have the dimensional characteristics such to be injected inside the furnace without creating problems for the pneumatic injection system. To reach this objective, a vibrating screen 26 is used with opening of about 6 mm, equipped with a selected material hopper unloading on the belt of the bucket elevator 28 and a separate tubing for unloading the over −6 mm material into a collection bin 28' or belt for its automatic recycling to the crusher module 01.

To convey the selected material to the top of the storage bin group, a bucket elevator belt 28 or other suitable transport means is used.

In FIG. 2, a filter 35 connected with a stack 36 is also represented. The filter acts as a separator and recovery of the powder picked up by the related suction/depulverisation facility 15A. The filter operates for the double object of ecologically protecting the entire plant and recovering the not previously conveyed powder.

The treated material coming from the storage bin 22 of the collection and selection facility is injected inside the electric furnace 24 by using an appropriate system of pneumatic injection. As in the example of FIG. 2, for the transport from the collection storage bin 22 to the intermediate storage bin 32 equipped with launch propeller 33 for the insufflation into the furnace by means of the injectors (for example spray) 34. The injection of the recycling material inside the furnace 24 preferably occurs, in fact, through the use of particular injectors 34 (such as, for example, the "KT Powder Injectors") which optimally lend themselves for the injection of different types of fines inside the EAF. In addition to having high levels of resistance to wear, ensured by a nozzle realised in steel for tools, such injectors are characterised by a particular cooling system which permits their high levels of resistance to high temperatures, even in very difficult working conditions.

In order to homogenise the injection of fines inside the furnace, the installation is foreseen of at least one (but preferably two) injectors.

The entire recovery and recycling facility of residues and debris materials according to the present invention is automatically managed by a control system essentially composed of a hardware (PLC, PC, HMI) and software necessary for the correct management and supervision of the complete system.

Figure 6:
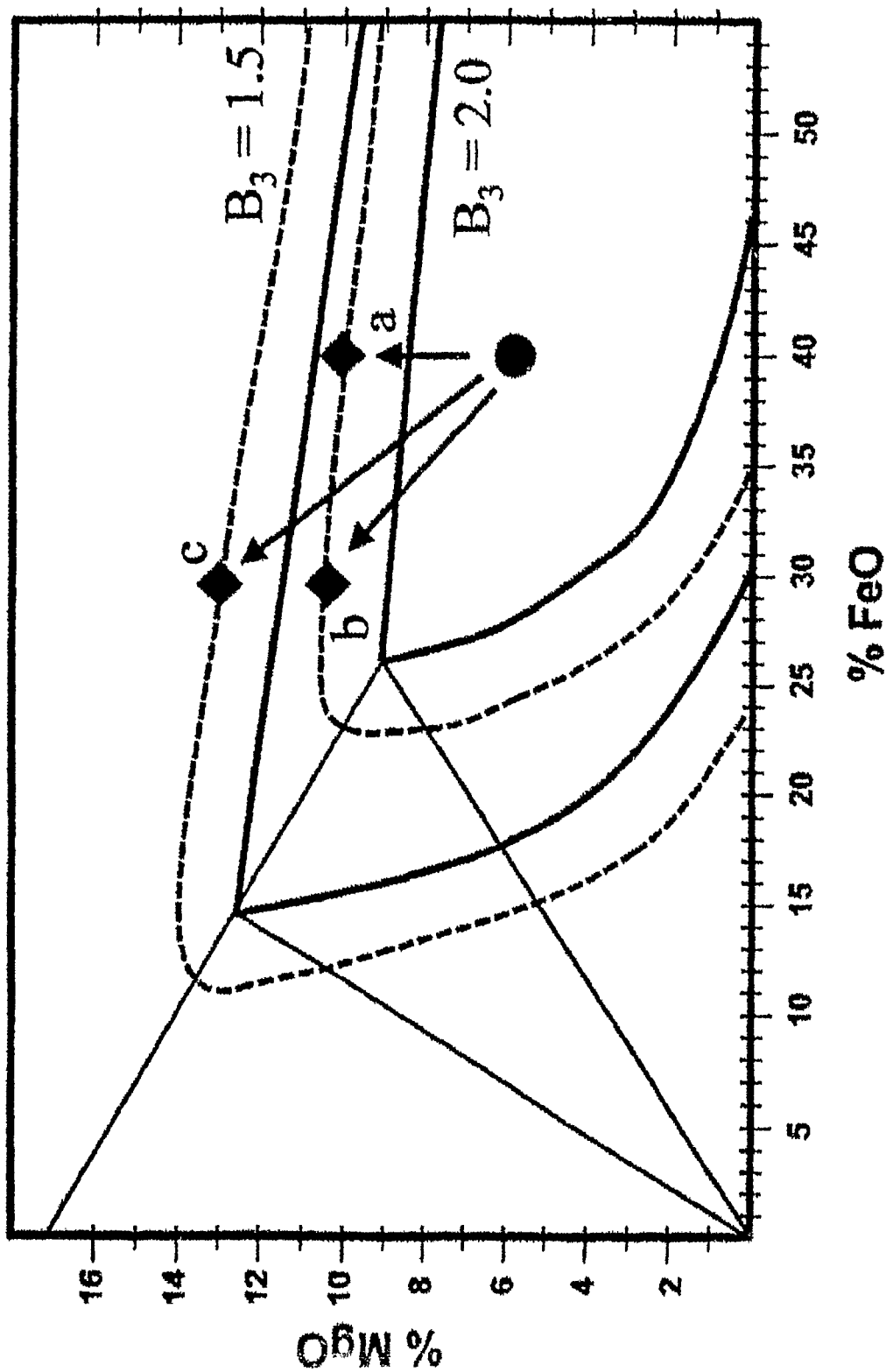
FIG. 6 represents a possible phase diagram or "Isothermal Stability Diagram" which may be used for obtaining the optimal composition of EAF slag.

In particular, an ISD (Isothermal Stability Diagram, possibly embedded in the control software) is reproduced in FIG. 6. In such figure, an example of an optimal work point choice (composition of the EAF slag) is illustrated at 1,600° C. with $B_3$—3-component basicity index (% CaO/(% $SiO_2$+% $Al_2O_3$))—comprised between 1.5 and 2. It may be noted how, beginning from an initial point (●) characterised by the absence of foaming (totally liquid phase), three different work points characterised by a similar foaming and different composition (♦) may be achieved, by means of appropriate metering of correction materials (containing CaO and MgO). The injection of the recovery mixture into the EAF increases the quantity of dicalcium silicate already present in the slag; the slag is characterised by having the following composition: olivine, merwinite, C3S, dicalcium silicate β, C4AF, C2F and RO phase (solid solution of CaO—FeO—MnO—MgO) and free CaO.

The dicalcium silicate present in the EAF slag is normally as a second phase of suspended particles, so that the addition of other particles coming from the mixture of recycled particles has three main consequences: a mass effect (smaller quantity of FeO), increase of MgO (present in the mixture) and increase in the nucleation sites for the CO, consequently leads to having a greater quantity of small gas bubbles in the foamy slag.

The presence of a second phase of suspended particles has a greater impact on the foaminess properties of the slag as regards the decrease of the surface tension and increase of viscosity, which also represent useful factors for obtaining a good foaminess.

The "optimal" slag is not completely liquid, but rather is a solid solution saturated with dicalcium silicate and magnesium-wustite, as shown in the diagram of FIG. 6.

Completing the apparatus for the recovery and metering according to the present invention as above described, a fumes and dust suction and treatment facility (15A, 35 and 36) is also present.

The scope of protection of the invention is defined by the attached claims.

The invention claimed is:

1. Method for the recovery of refractory debris materials and ladle slags and using said materials and slags as process slags in iron metallurgy production in electric arc furnaces, and the related metering to the furnace for the formation of the process slag, such method comprising the following steps:
    grinding and screening of said refractory debris materials until powders of controlled granulometry are obtained,
    breaking down the ladle slag to form a powder,
    storing the powder obtained from the debris materials and the ladle slag in storage sites, and said grinding and screening of refractory debris materials being carried out separately from said breaking down of said ladle slag, and
    injecting the powders into an electric arc furnace by automatically metering the powders obtained from the debris materials and the ladle slag into the electric arc furnace wherein the composition of the powders injected is automatically determined by a management system.

2. Method according to claim 1, characterised in that the metering of the powders obtained from the debris materials and the ladle slag that are required for obtaining the process slag is carried out when the powders are derived from grinding and screening the debris materials and breaking down the slag.

3. Method according to claim 1, characterised in that the metering of the powders obtained from the debris materials and the ladle slag necessary for obtaining the process slag is carried out at an intermediate storage bin before injecting the process slag into the furnace.

4. Method according to claim 1, characterised in that the metering of the powders obtained from the debris materials and the ladle slag which is necessary in order to obtain the process slag is carried out in the furnace by means of one or more injectors.

5. Method according to claim 1, characterised in that the refractory debris materials comprise ladle refractory, tundish refractory, electric arc furnace refractory, recovery powders or fines.

6. Method according to claim 1, characterised in that a deferrisation process is carried out before the storage step.

7. Method according to claim 1, characterised in that a process of dimensional screening is carried out before the storage step.

8. Method according to claim 6, characterised in that the deferrisation process recovers iron by means of a magnetic separator.

9. Method according to claim 7, characterised in that the dimensional screening process comprises screening with a screen having opening preferably up to 10 mm.

* * * * *